April 8, 1941.  J. VAN BUREN  2,237,918
PRESS
Filed March 3, 1939  9 Sheets-Sheet 3
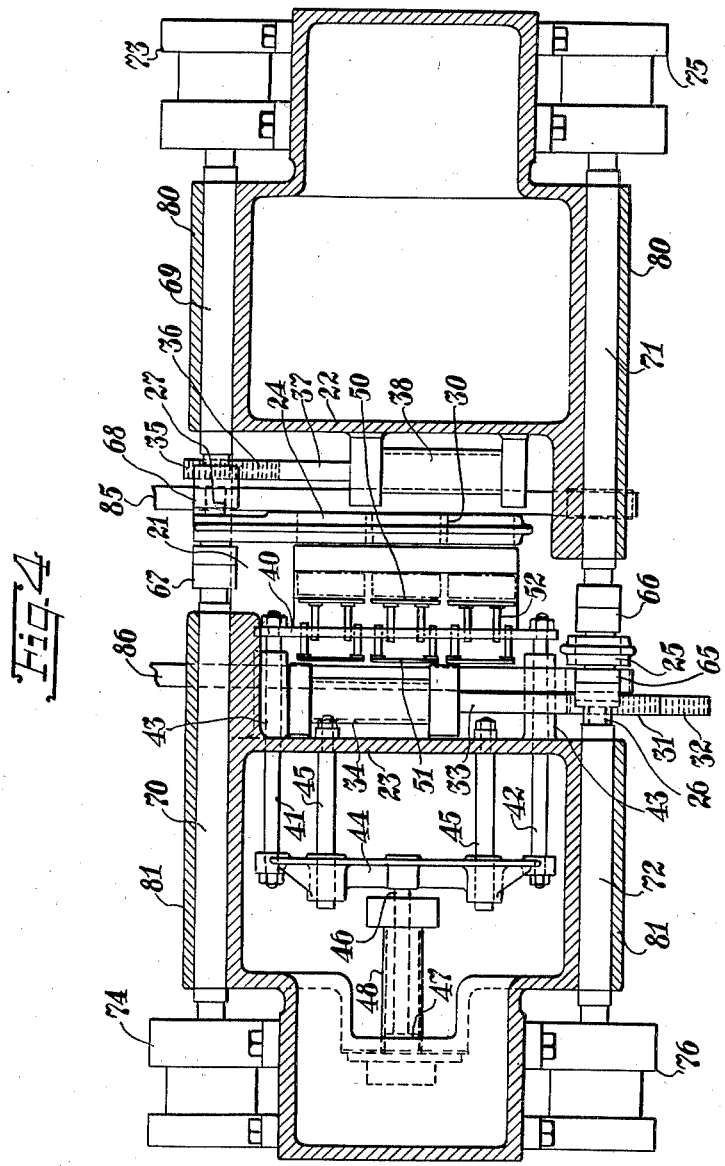
INVENTOR
John Van Buren
BY
Marshall & Hawley
ATTORNEYS

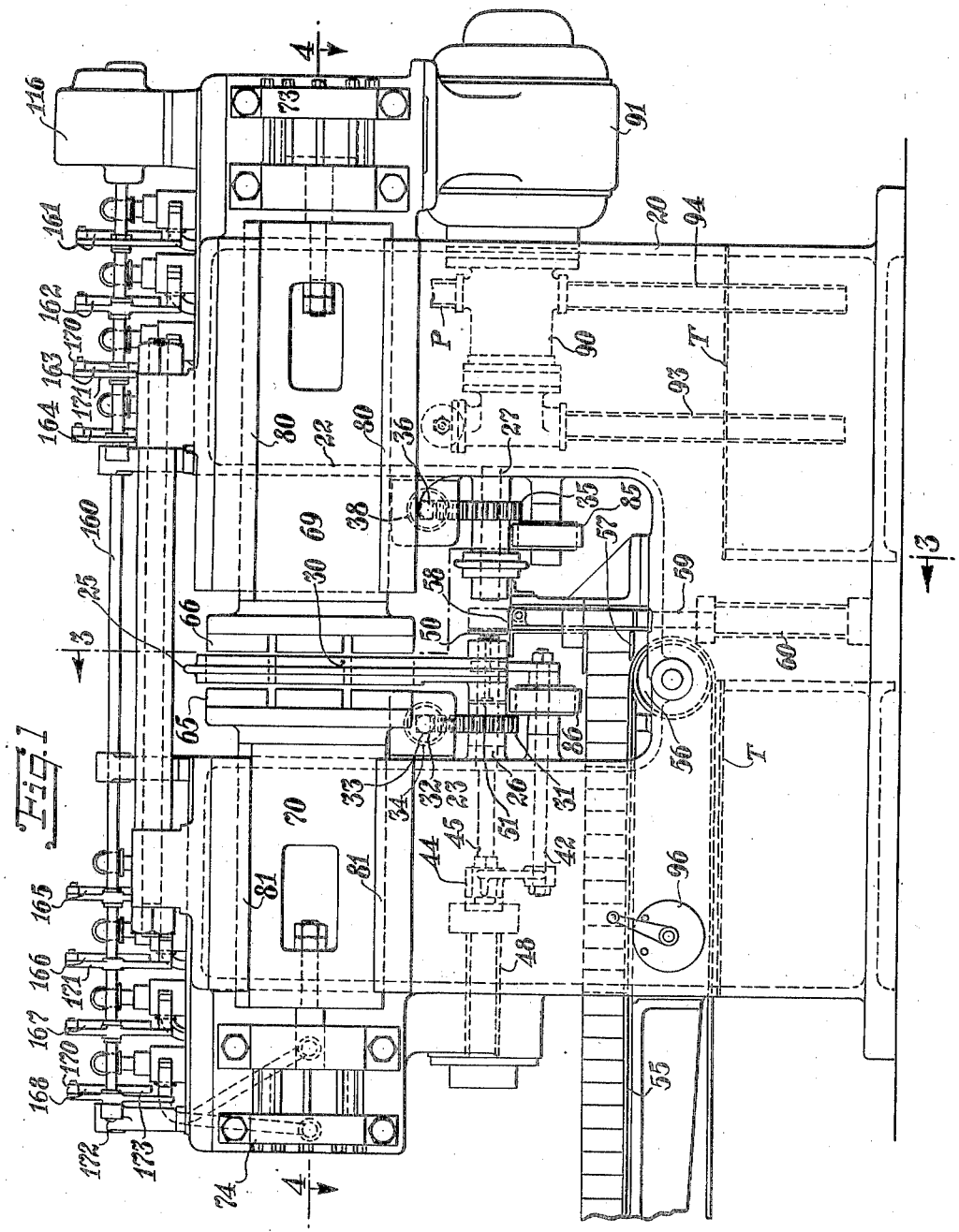

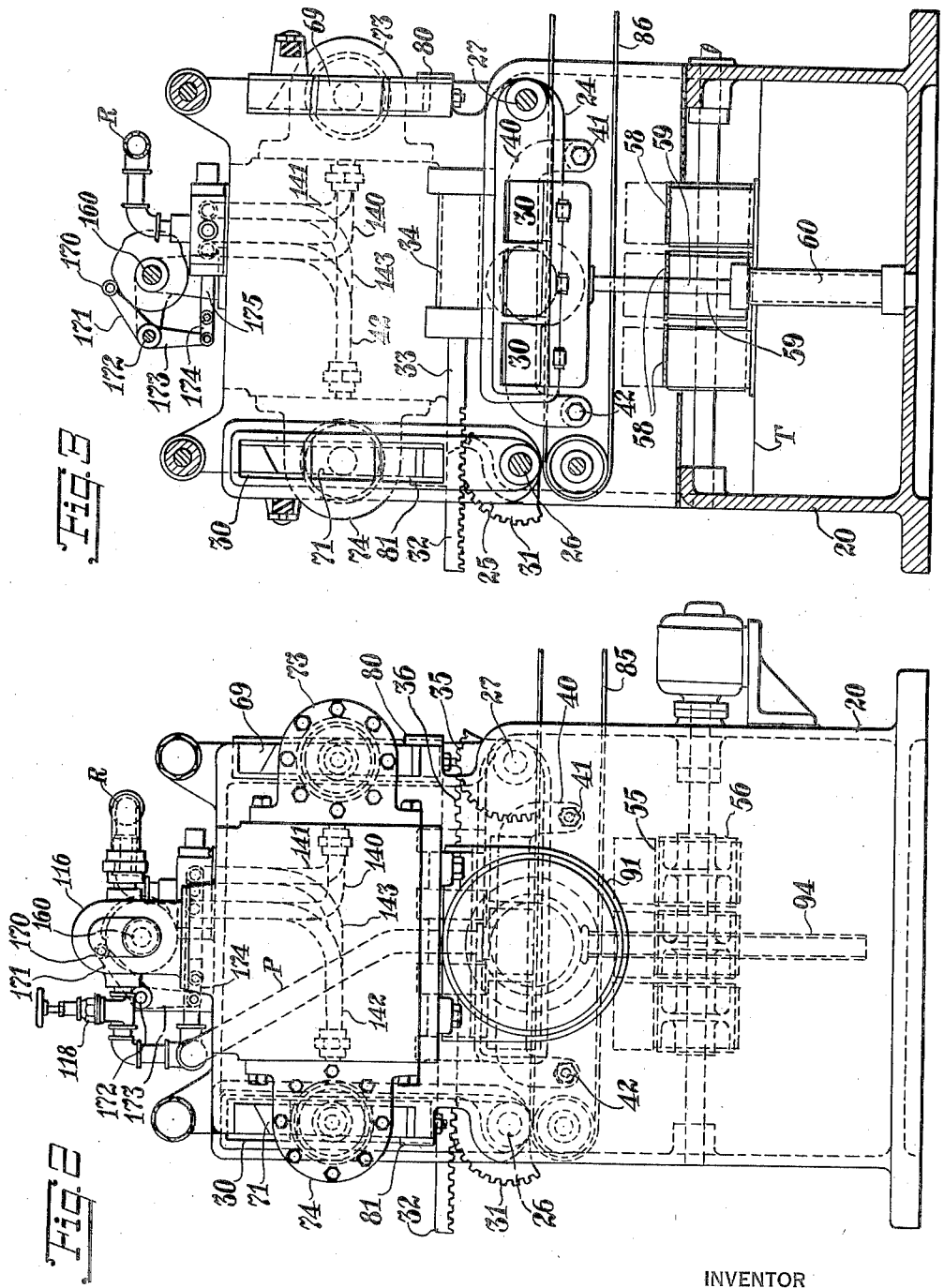

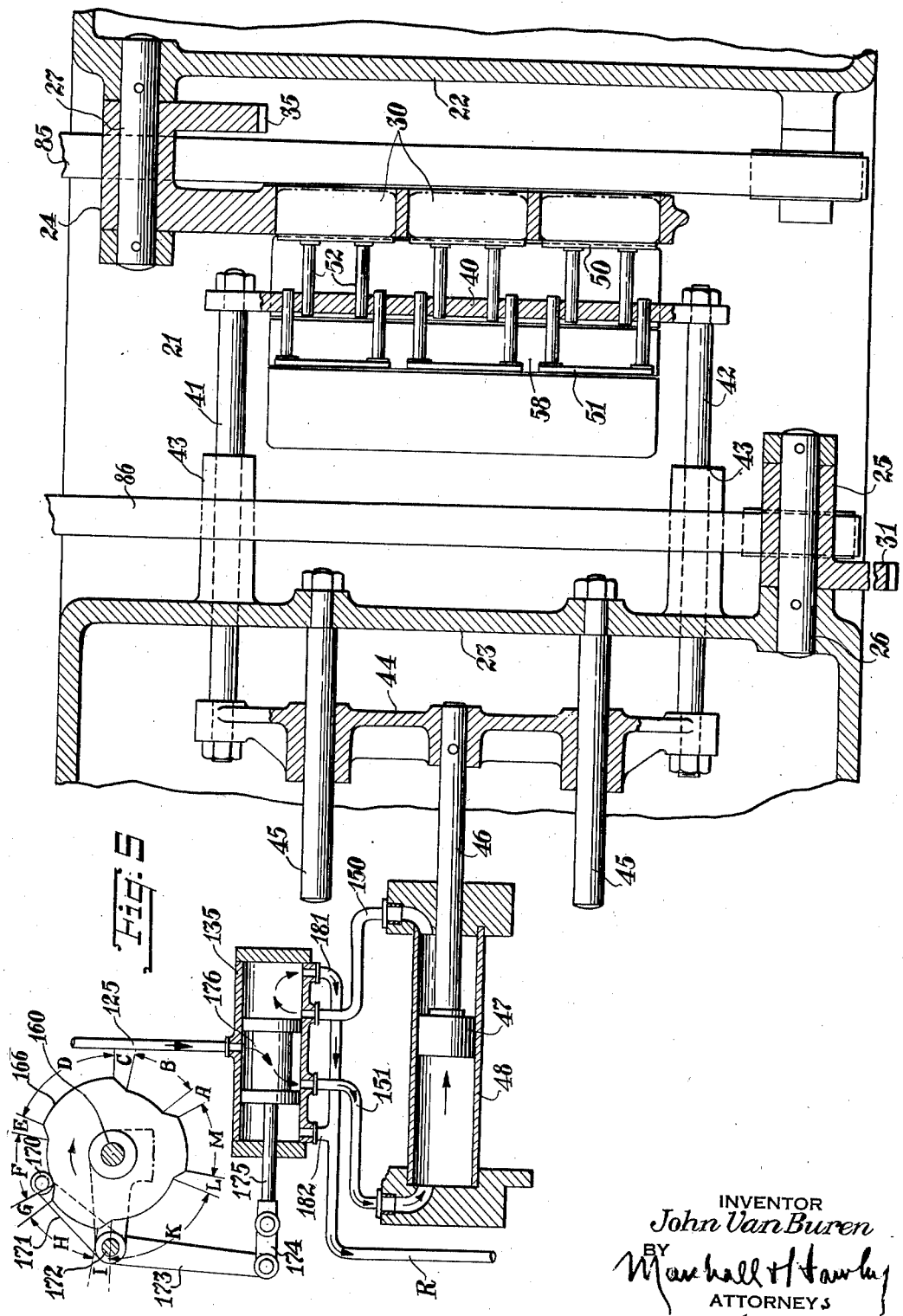

April 8, 1941.   J. VAN BUREN   2,237,918
PRESS
Filed March 3, 1939   9 Sheets-Sheet 5
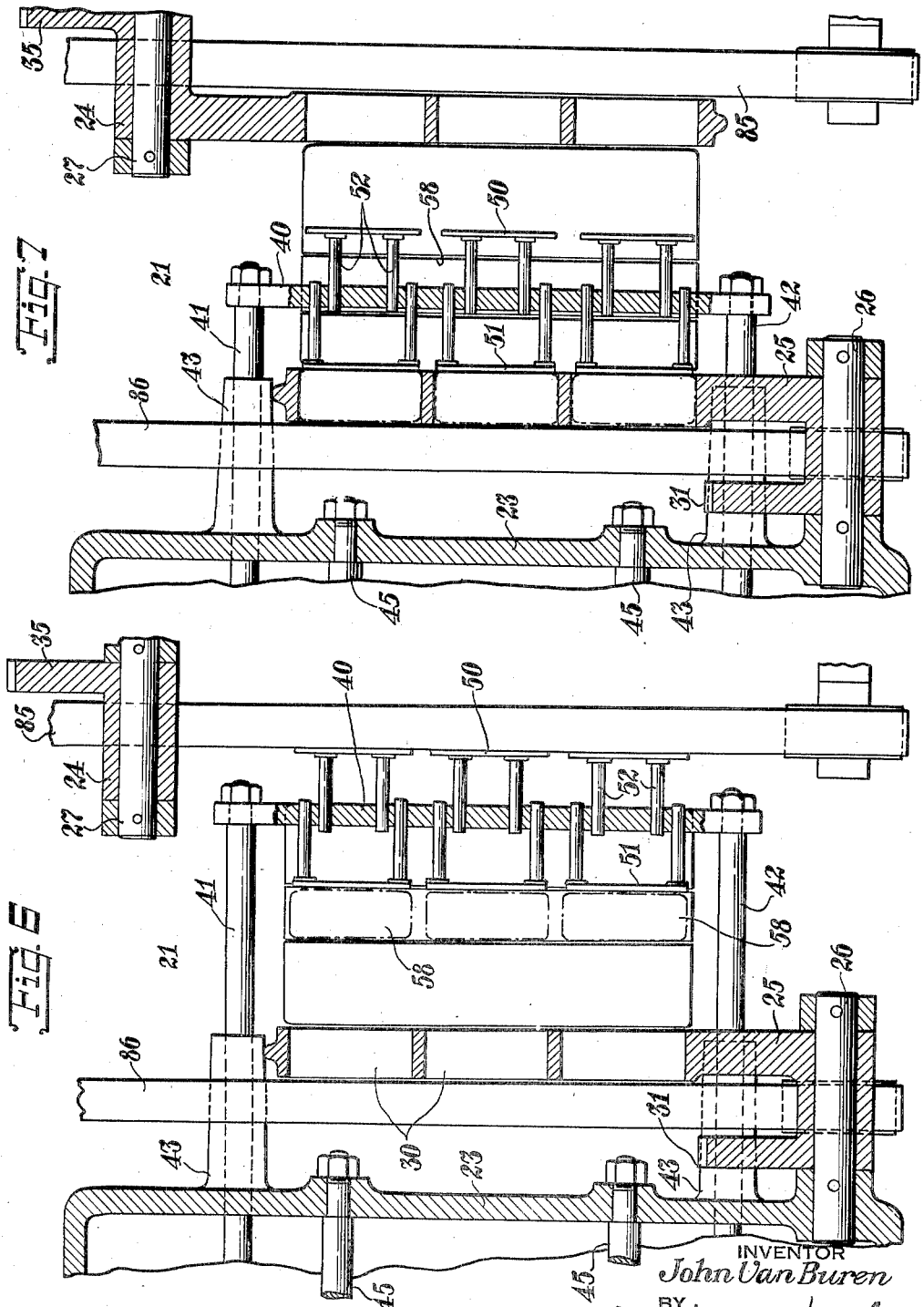
INVENTOR
John Van Buren
BY
Marshall & Hawley
ATTORNEYS

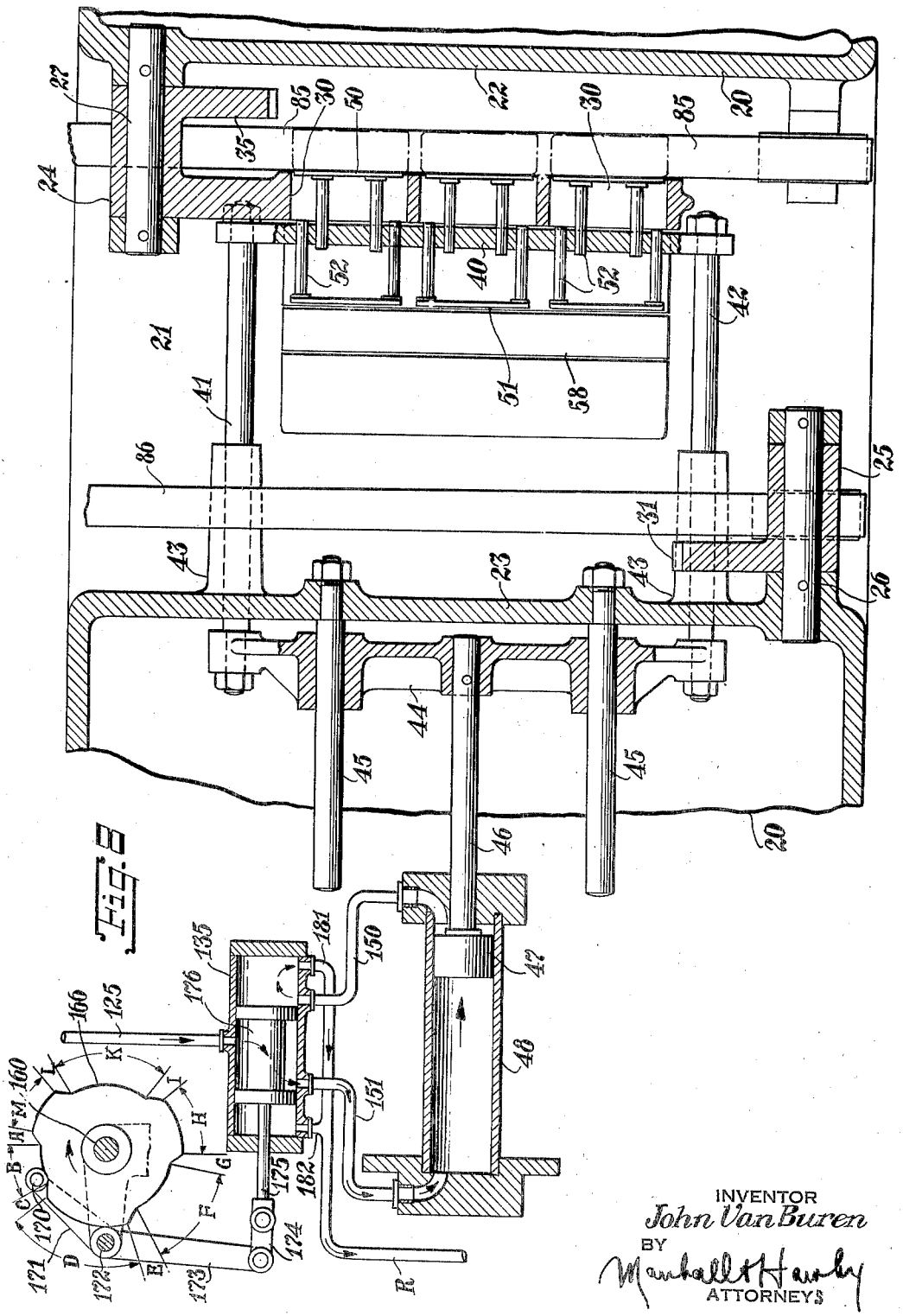

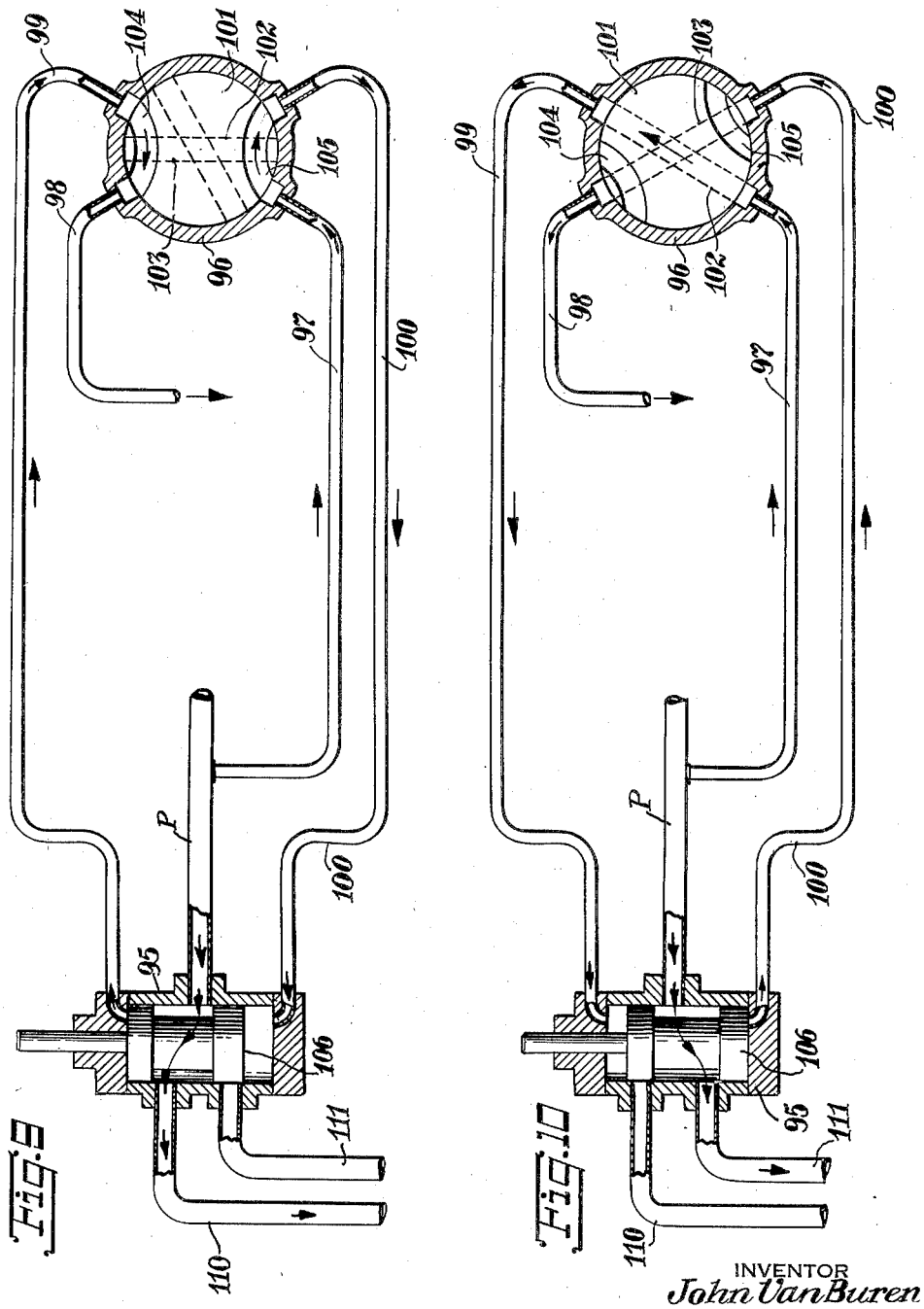

April 8, 1941.   J. VAN BUREN   2,237,918
PRESS
Filed March 3, 1939   9 Sheets-Sheet 9
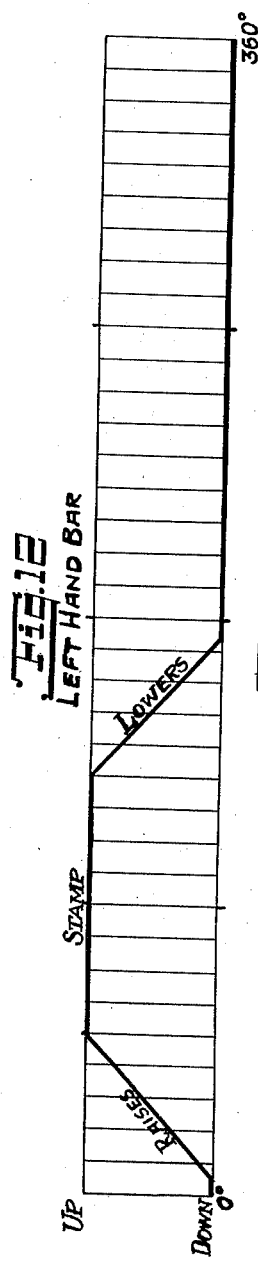
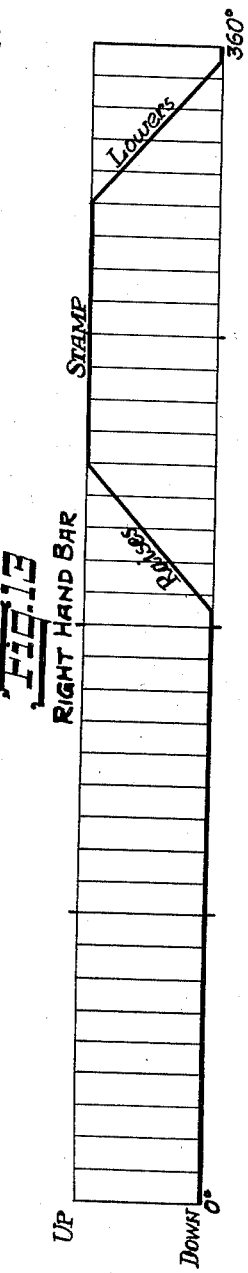
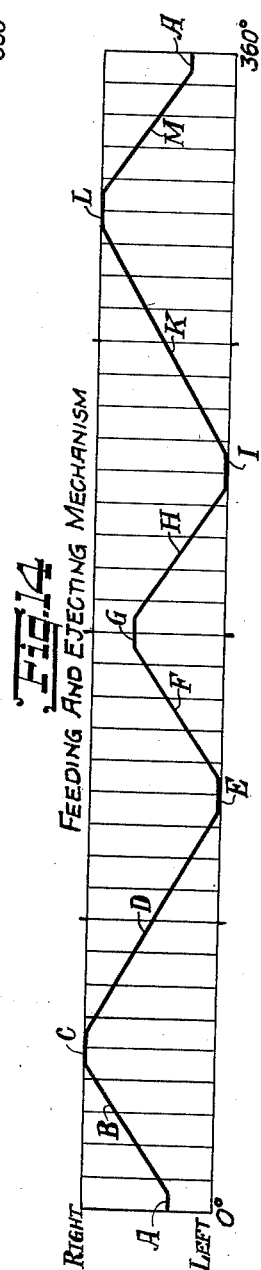
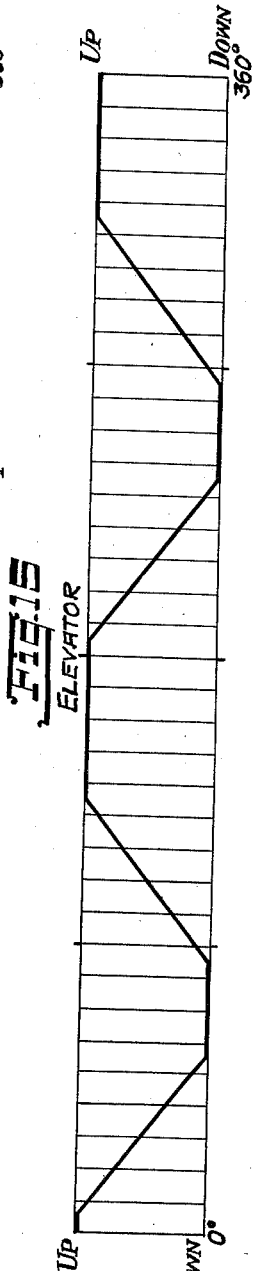
INVENTOR
John Van Buren
BY
Marshall H Hawley
ATTORNEYS Patented Apr. 8, 1941

2,237,918

UNITED STATES PATENT OFFICE 2,237,918

PRESS

John Van Buren, Brooklyn, N. Y.

Application March 3, 1939, Serial No. 259,598

11 Claims. (Cl. 25—9)

This invention relates to a press, and particularly to a press for pressing soap cakes or like plastic material.

Machines of this character which are now on the market are easily operated by cams, levers, toggle mechanism, links, etc., and are heavy and massive in construction. Due to the mechanism by which they are operated the machines are severely jarred and this shortens the life of the machine and necessitates frequent and costly repairs.

This invention has for its object to provide a machine of the character described that is simple in construction, has a minimum number of moving parts and is so constructed and arranged that it will operate efficiently without the terrific jarring experienced with machines of this character.

Another object of the invention is to provide a machine of the character described, having simple, practical and efficient control means.

Another object of the invention is to provide a machine of the character described so constructed and arranged that the parts can be operated by hydraulic pressure, thus obviating the use of heavy levers, toggle mechanism, etc.

Further objects of the invention will appear from the following specification taken in connection with the drawings which form a part of this application, and in which, Fig. 1 is a front elevation of the machine constructed in accordance with the invention;

Fig. 2 is an end elevation looking at one end of the machine shown in Fig. 1;

Fig. 3 is a vertical sectional elevation taken substantially on line 3—3 of Fig. 1 and looking in the direction of the arrows;

Fig. 4 is a horizontal sectional elevation taken substantially on line 4—4 of Fig. 1 and looking in the direction of the arrows;

Fig. 5 is a detail horizontal sectional elevation taken on the section line of Fig. 4, but showing the combination loading and ejecting mechanism in the position taken when the right hand matrix bar is being loaded;

Fig. 6 is a view similar to Fig. 5 but showing the combination loading and ejecting device at the extreme right hand end of its movement and about to travel to the left and load the left hand matrix bar;

Fig. 7 is a view similar to Figs. 5 and 6 but showing the left hand matrix bar loaded;

Fig. 8 is a view similar to the preceding views but showing the mechanism in the position taken when the stamped or pressed articles or cakes have been ejected from the right hand matrix bar;

Figs. 9 and 10 are sectional views somewhat diagrammatic, showing the operation of the pilot valve and two-way valve controlled thereby, these parts being shown in Figs. 9 and 10 in inoperative and operative positions of adjustments;

Fig. 12 is a diagram illustrating the movement of the left hand matrix bar or die box arm during the cycle of operation of the machine;

Fig. 13 is a similar view illustrating the movement of the right hand matrix bar or die box arm;

Fig. 14 is a similar diagram showing the movements of the feeding and ejecting device at different portions of the cycle of operation of the machine; and Fig. 15 is a similar diagram illustrating the movements of the elevator or lifting device which lifts the article, such as soap cakes, to a position in which they can be fed into the matrix bars or die box arms.

Figure 11:
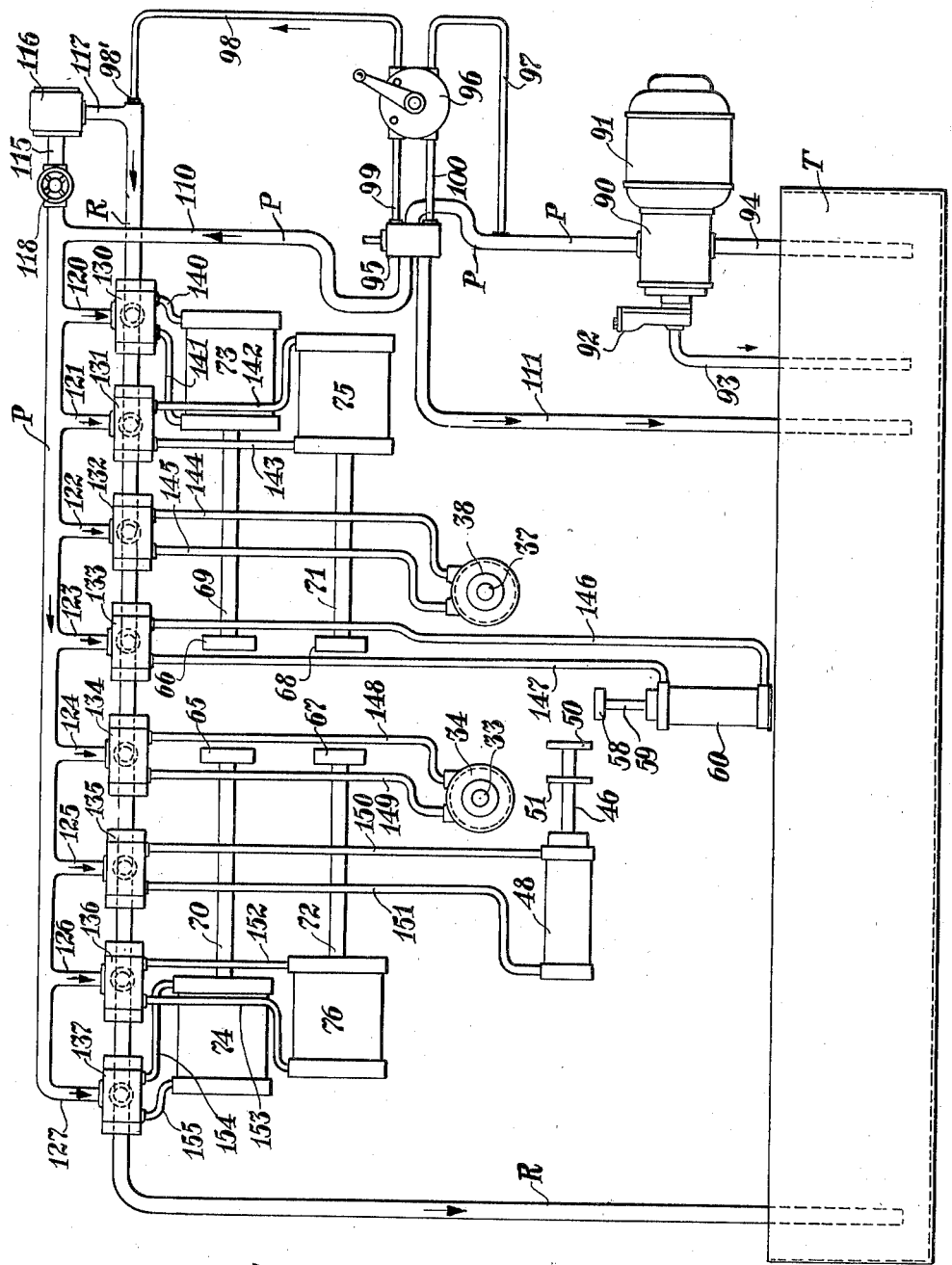
Fig. 11 is a diagrammatic view showing the hydraulic and control mechanism therefor.

The invention briefly described consists of a machine for pressing articles, such as cakes of soap, and comprises a pair of pivoted and oscillatable die box arms or matrix bars, means disposed between said bars and so controlled as to load the bars when they are disposed in their down or horizontal positions and to eject the pressed cakes or articles from the bars after they have been pressed and the arms have been returned to horizontal position. The machine further comprises means operative when the loaded matrix bars have been raised to their vertical positions for pressing the cakes therein. The loading mechanism engages cakes after they have been raised by lifting or elevating means, the operation of said means being so timed as to elevate the cakes at the proper periods in the cycle of operation of the machine, so that the cakes can be engaged by the loading mechanism and pushed into the die box arms or matrix bars.

The machine further comprises hydraulic operating mechanism and automatically operating control means for the hydraulic system so worked out that the various parts will be operated in the desired sequence.

Further details of the invention will appear from the following description.

*Matrix bars and control therefor*

In the particular embodiment of the invention illustrated in the drawings there is shown a machine frame 20 having a vertical space 21 between frame members 22 and 23 in which are mounted a pair of matrix bars 24 and 25 which are mounted respectively on shafts 26 and 27. Each of the matrix bars has a plurality of openings 30 for receiving the articles to be pressed.

The matrix bars are oscillated from horizontal to vertical position and vice versa by means of rack and pinion means illustrated particularly in Figs. 2 and 3. Shaft 26 has a segmental gear 31 mounted thereon, this gear being engaged by a rack 32 carried by a plunger 33 which is operated by a piston cylinder 34. The other shaft 27 has a segmental gear 35 secured thereto which is engaged by a rack 36 carried by a plunger 37 and operated by a piston in the cylinder 38.

The passage of hydraulic fluid to and from the cylinders 34 and 38 is so controlled that the matrix bars will be oscillated at the desired times in the cycle of operation of the machine. This control mechanism will be later described in connection with the diagrammatic showing in Fig. 11.

Cake feeding and ejecting mechanism

The loading of articles into the matrix bars and the discharge of articles therefrom is accomplished by means of combination loading and ejecting devices comprising a cross head 40 carried by rods 41 and 42 which are slidable in bearings 43 formed in or carried by the frame member 23. The posts are connected at their rear ends to a cross head 44 which is guided on rods 45 carried by the frame member 23 and has secured thereto and extending rearwardly therefrom a plunger rod 46 on which is mounted a piston 47 disposed in a cylinder 48.

The cross head 40 has secured thereto and extending in opposite directions therefrom two sets of loading and ejecting plates 50 and 51, these plates being carried by posts or rods 52 secured to the cross head 40. The plates are so spaced as to be alined with the openings in the matrix bars when the bars are disposed in horizontal position. Before describing in further detail the construction and operation of the feeding and ejecting means, the elevating means for lifting the cakes into position to be engaged by the feeding mechanism will be described.

Cake elevating mechanism

The articles or soap cakes are fed into the machine on an endless conveyor 55, the delivery end of this conveyor being supported on and extending around a pulley 56. From the conveyor 55 the cakes are delivered on a table 57 which is disposed adjacent the path of movement of elevator plates 58 mounted on the upper end of a plunger 59 which has secured thereto a piston disposed in a hydraulic cylinder 60.

The hydraulic system and the control of the pressure fluid for operating the cylinder 60 and plunger 59 will be hereinafter described, but this system is so worked out that pressure fluid will be admitted to the lower end of the cylinder 60 to elevate the plunger 59 and the elevator plates 58 at the required time in the cycle of operation of the machine to lift articles or cakes to an elevated position in the path of movement of the plates 50 or 51, as the case may be.

Cake pressing mechanism

Two sets of pressing dies are provided, one set for each of the matrix bars or die box arms. These dies are indicated diagrammatically in Fig. 11 as dies 65 and 66 and 67 and 68. The dies are mounted on slides 69, 70, 71 and 72 which are slidably mounted in guides 80 and 81. The slides 69 and 70 are carried by plungers having mounted on their ends pistons disposed in cylinders 73 and 74. The corresponding cylinders for the slides 71 and 72 are designated 75 and 76. The control of the hydraulic fluid to the cylinders 73, 74, 75 and 76 will be hereinafter described in connection with the diagrammatic illustration of the hydraulic system shown in Fig. 11. The passage of the pressure fluid to and from these cylinders is so controlled that the dies for the matrix bars 24 and 25 will operate to compress the cakes disposed in the die openings therein when the bars are in elevated position. For instance, the bar 25 is in elevated position in Fig. 1 and the dies 65 and 66 are about to compress the cakes disposed in the die openings.

Ejecting and discharge mechanism

After the cakes have been compressed by the presser dies the matrix bars move down to horizontal position and the pressed cakes are discharged from the matrix bars by the plates 50 or 51, as the case may be. As they are discharged or ejected from the matrix bars they are deposited on one of the conveyor belts 85 or 86, the cakes discharged from the right hand matrix bar 24 being deposited on the belt 85 and the cakes discharged from the matrix bar 25 being deposited on the conveyor belt 86. In Fig. 8, for instance, the cakes have been discharged by the plates 50 on the conveyor belt 85.

Hydraulic control mechanism

In Fig. 11 there is shown an oil reservoir T and a hydraulic pump 90 which sucks the fluid from the reservoir and discharges the fluid into a pressure line P. The pump 90 is driven by a motor 91 and an automatic relief valve 92 is connected to the pump to by-pass the fluid through a return pipe 93 to the reservoir or tank T. The pump inlet pipe is indicated at 94. The pressure line P leads to a two-way valve 95 which is controlled by a pilot valve 96 in the manner illustrated particularly in Figs. 9 and 10. The pressure line P is connected to the casing of the pilot valve 96 by a branch conduit 97 and the casing of the pilot valve has a discharge conduit 98 which connects at 98' with the main return line R which discharges into the tank or oil reservoir T.

The casing 96 is also connected by conduits 99 and 100 to the two-way valve 95, these conduits being connected to the ends of the valve casing.

In the pilot valve casing there is mounted a pilot valve consisting of a block 101 having diagonally disposed transverse conduits 102 and 103 extending therethrough and having curved conduits 104 and 105 formed therein. The valve is adjusted in Fig. 10 to conduct the pressure fluid from the branch conduit 97 to the valve conduit 102 to the conduit 99 which connects with one end of the two-way valve 95. The piston 106 in the two-way valve 95 is thereby forced to the bottom of the valve casing viewing Fig. 10, thus permitting the pressure fluid to pass from the main pressure line P through the valve 95 into the return conduit 111.

When the valve is adjusted as shown in Fig. 10, the other end of the two-way valve 95 is connected through the conduit 100 and transverse passage 103 to the return line 98.

In Fig. 9 the valve is adjusted for running position, or in other words, is so adjusted that the pressure fluid can flow into the hydraulic system. In this adjustment of the valve the pressure fluid from the conduit P passes through the conduit 97 and through the valve conduit 105 into the conduit 100 and thence into the lower end of the valve 95. This forces the piston 106 to the other end of the valve closing the outlet conduit 111 and opening the pressure conduit 110 which conducts the fluid into the main pressure line.

In Fig. 9 the other end of the valve 95 is connected through pipe 99 and conduit 104 to discharge conduit 98.

Thus, when the pilot valve is adjusted to the position shown in Fig. 9, the pressure fluid is connected into the main pressure line of the hydraulic system and when the pilot valve is adjusted as shown in Fig. 10 the pressure fluid is shut off from the main pressure line and from the hydraulic system.

Referring again to Fig. 11, the main pressure line above the two-way valve 95 is connected by a pipe 115 to drive a hydraulic motor 116, the fluid being discharged from this motor through a pipe 117 into the return line R. A flow control valve 118 is mounted in the conduit or pipe 115 to control the flow of the pressure fluid to the motor 116.

The main pressure line P is connected through branch conduits 120, 121, 122, 123, 124, 125, 126 and 127 to valve 130, 131, 132, 133, 134, 135, 136 and 137 which in turn control the passage of fluid to the pressure die control cylinders 73 and 75, matrix bar control cylinder 38, elevator cylinder 60, matrix bar control cylinder 34, ejector and loading mechanism cylinder 48 and presser die control cylinders 76 and 74, respectively.

The passage of the pressure fluid to and from the cylinder 73 from the valve 130 takes place through conduits 140 and 141. The valve 131 is connected to the cylinder 75 by conduits 142 and 143.

The matrix bar control cylinder 38 is connected to the valve 132 by conduits 144 and 145. The elevator cylinder 60 is connected to the valve 133 by conduits 146 and 147. Matrix bar control cylinder 34 is connected by conduits 148 and 149. Cylinder 48 is connected to the valve 135 by conduits 150 and 151. Cylinder 76 is connected to valve 136 by conduits 152 and 153 and cylinder 74 is connected to valve 137 by conduits 154 and 155.

The valves 130–137, inclusive, are controlled by suitable cam mechanism, the cams being mounted on a shaft 160 which is driven by the hydraulic motor 116. The cams are designated 161–168, inclusive.

Each cam is engaged by a roller 170 carried by a rocker arm 171 pivoted at 172 and having connected thereto an arm 173 which in turn is connected by a link 174 to a piston rod 175 which is connected to the piston 176 which controls the passage of fluid through the valve and to or from the cylinder controlled by said valve.

It will be understood that the cams 161–168, inclusive, are so designed as to operate the pistons in the cylinders in the desired direction at the required periods in the cycle of operation of the machine.

In order to make clear the positions of the various operating elements at the different periods in the cycle of operation of the machine, these positions are illustrated diagrammatically in Figs. 12–15, inclusive. In these figures the diagrams from left to right represent 360° of movement or one entire cycle in the operation of the machine. The vertical sections indicate 10° increments.

Figs. 12 and 13 indicate the positions of the matrix bars or die box arms 25 and 24, respectively, Fig. 12 thus indicating the left hand die box arm or matrix bar 25 and Fig. 13 indicating the position of the right hand die box arm or matrix bar 24. From these two figures it will be seen that at the start of the cycle and for about 5° of movement both matrix bars are in the down position or horizontal position. After 5° of movement the left hand matrix bar 25 is raised, reaching its elevated position at about 45° of movement, after which the pressing operation takes place. After about 80° of movement the matrix bar 25 starts to move to its lower position or horizontal position of movement, reaching this position just in advance of the half way period in the cycle of operation.

During this entire 180° of movement the right hand matrix bar 24 is in horizontal position of movement and the load therein has been discharged and a new load has been inserted in bar 24. After a 180° of movement in the cycle of operation, the right hand matrix bar 24 is elevated, the load is stamped and the bar is again lowered in exactly the same manner as the left hand matrix bar 25 in the first 180° of movement.

The cycle of operation of the feeding and discharge mechanism is illustrated in Fig. 14 and is somewhat more complicated than the operation of the other elements of the combination since this mechanism fills and discharges both matrix bars or die boxes in one 360° cycle of operation of the machine.

As will be seen from a comparison of Figs. 12 and 14, the left hand matrix bar 25 is down at the beginning of the cycle and for the first 5° of movement in the cycle of operation of the machine the left hand matrix bar 25 is being loaded. This loading operation starts during the last 5° of movement in the cycle of operation, as shown at the right hand end in Fig. 14. For convenience in later describing the cam operation which controls the movement of the feeding and discharge mechanism this period in the cycle of operation is designated A. After the left hand matrix bar 25 has been loaded the fluid is admitted to the left hand end of the cylinder 48 and the piston rod which controls the movement of the cross head 40 moves to its extreme right hand position, thus ejecting the pressed cakes from the right hand matrix bar 24 which is disposed in its horizontal position, as shown in Fig. 13. During the period in the cycle of operation designated B, the plates 50 carried by the cross head 40 have moved from the position shown in Fig. 7 to the position shown in Fig. 8, or in other words, have discharged the pressed articles or cakes from the right hand matrix bar 24.

After this has been accomplished the cross head 40 and the plates 50 and 51 carried thereby move during the portion D in the cycle of operation entirely to the left hand extreme position, as indicated for instance, in Fig. 4, and at this time the elevator raises a load of cakes into position for engagement by the plates 50 carried by the cross head 40 and after the cross head has reached its extreme left hand position designated at E in Fig. 14, the return movement to the right starts and during the period F in the cycle of operation the right hand matrix bar 24 is loaded. This loading is completed and after a slight dwell designated as G the cross head 40 starts to move to the left and moves to the extreme left hand position during the portion H and ejects the load from the left hand matrix bar. After a slight dwell designated as I the cross head 40 starts its return movement to the right which takes place during the period K. In this position the plates 51 are positioned behind a new load. The cross head then starts toward the left and moves toward the left during the period M, during this period effecting the loading of the left hand matrix bar 25.

Any suitable cam may be provided for controlling the passage of fluid to and from the cylinder 48 through the valve 135. Fig. 5 illustrates a suitable cam 166 and the operation of the piston in the valve 135 can be readily understood by the lines designating the successive degrees of movement, these increments of movement or portions in the cycle of operation in the machine being designated A, B, C, D, E, F, G, H, I, K, L, M, respectively, in a manner corresponding to their designation on Fig. 14.

The operation of the loading and ejecting mechanism may be briefly summarized as follows, attention being directed to Figs. 4–8, inclusive. In Fig. 4 the cross head 40 is disposed at its extreme left hand position of movement, this position being designated at E on Fig. 14. A load of articles or cakes to be pressed has been elevated by the elevator and is in a position to be engaged by the pusher plates 50 as the cross head 40 moves to the right.

In Fig. 5 the right hand matrix bar 24 has been loaded and the cross head 40 is disposed in the position designated at G on Fig. 14. After the right hand matrix bar 24 has been loaded as shown in Fig. 5, the matrix bar again moves to the left and at the position J on Fig. 14 ejects the load from the left hand matrix bar 25.

From the position J, Fig. 14, the cross head moves to the extreme right hand end of its movement designated at L and illustrated in Fig. 6. In this position another load of articles to be pressed is raised by the elevator and the cross head again moves to the left, as shown at M, and in the position A deposits a load in the left hand matrix bar 24, as shown in Fig. 7.

The cam 166, as above stated, operates a rocker arm comprising arms 171 and 173 and moves a slide valve 176 in the valve casing 135. The valve casing has the pressure line connection through the conduit 125 and has the conduits 150 and 151 which connect with the cylinder 48. The casing also is connected to the return line R through a pair of conduits 181 and 182. The piston 176 is shown in Fig. 5 as establishing communication between the pressure line 125 and the conduit 151 which leads into the left hand end of the cylinder 48. Thus, the piston in the cylinder 48 is being moved to the right. The conduit 150 which connects with the other end of the cylinder communicates through the casing 135 with the discharge conduit 181 which, as stated, is connected to the return line R. As the piston is moved by the cam 166 to the right past the discharge conduit 151, the pressure conduit 125 will communicate with the conduit 150 and the pressure fluid will force the piston in the cylinder 48 to the left. The other end of the cylinder 48 will be connected through the conduit 151 with the discharge conduit 182 and thus to the return line R.

Again referring to the diagrams in Figs. 12–15, inclusive, the operation of the elevator feeding and ejecting devices and right hand and left hand matrix bars or die box arms can be readily followed through the cycle of operation of the machine.

During the first half of the cycle the left hand bar is loaded, is raised to vertical position, the load is pressed and the arm descends to its horizontal position. During this same half of the cycle the elevator is initially raised, descends after the left hand arm is loaded and is again raised with a second load. During the same half of the cycle the right hand bar or arm is down and the load is ejected therefrom.

During the second half of the cycle the right hand bar or die box arm is loaded, raised to vertical position, the load is pressed and the arm returns to horizontal position. During this time the left hand arm is down and the load is ejected. The elevator is raised at the beginning of the second half of the cycle, but after the right hand bar is loaded, descends and is then raised with the second load.

The foregoing operations can be easily followed on the charts or diagrams by lining up the corresponding vertically alined increments of movement of the machine through the cycle.

From the foregoing analysis it will be seen that during the complete cycle of operation of the machine each arm or bar receives a load, the load is pressed and the load is ejected. Furthermore, the movements of the matrix bars or die box arms, the operations of the loading and ejecting mechanism and the operations of the pressing dies are all accomplished through hydraulic means, the various hydraulic cylinders being controlled in their operations by suitably designed cams.

From the foregoing specification it will be evident that a simple, practical and efficient machine has been designed for accomplishing the desired purposes and that this machine comprises a minimum number of operating parts which can be automatically controlled to accomplish their functions.

Although one specific embodiment of the invention has been particularly shown and described, it will be understood that the invention is capable of modification and that changes in the construction and in the arrangement of the various cooperating parts may be made without departing from the spirit and scope of the invention, as expressed in the following claims.

What I claim is:

1. A soap press comprising a pair of independently movable matrix bars, each having mold cavities therein, means for moving each of said bars from an initial cake receiving position to a second position in which the cakes are pressed and for returning the bars to their initial positions, combination cake feeding and ejecting means disposed between said bars and operable to feed cakes successively into said matrix bars when said bars are in their initial positions and to eject the pressed cakes from said bars after the cakes have been pressed in the second positions of said bars and the bars have returned to their initial positions, means for operating said feeding and ejecting means and means for pressing the cakes in the bars when the bars are in their second position.

2. A soap press comprising a pair of matrix bars located in parallel planes, each having mold cavities therein, means for independently moving said bars from an initial cake receiving position to a second position in which the cakes are pressed and for returning the bars to their initial positions, combination cake feeding and ejecting means disposed between said bars and operable to feed cakes successively into said matrix bars when said bars are in their initial positions and to eject the pressed cakes from said bars after the cakes have been pressed in the second positions of said bars and the bars have returned to their initial positions, and oppositely acting, reciprocatable means for pressing the cakes in the bars when the bars are in their second position.

3. A soap press comprising a pair of matrix bars, each having mold cavities therein, means for moving said bars from an initial cake receiving position to a second position in which the cakes are pressed and for returning the bars to their initial positions, combination cake feeding and ejecting means disposed between said bars, means for operating said feeding and ejecting means to feed cakes successively into said matrix bars when said bars are in their initial positions and to eject the pressed cakes from said bars after the cakes have been pressed in the second positions of said bars and the bars have returned to their initial positions, and means for pressing the cakes in the bars when the bars are in their second position, the cakes being loaded, pressed and ejected from one bar during one cycle of operation of the machine and being loaded, pressed and ejected from the other bar during another cycle of operation.

4. A soap press comprising a pivoted matrix bar having mold cavities therein, means for feeding soap cakes into said bar when the bar is in one position, means for moving the bar to a second position, means for pressing the cakes when the bar is in said second position, means for returning the bar to its initial position, and means for actuating said soap feeding means to a sufficient distance to eject said cakes from the bar when the bar has returned to its initial position.

5. A soap press comprising a pair of spaced matrix bars, means for moving each bar from an initial position to a second position, combination loading and ejecting means disposed between said spaced bars and operative successively to load said bars when they are in their initial positions and to successively eject the loads from said bars when they have returned to their initial positions and means for pressing the load in each bar when the bar is in its second position, said loads being ejected after the pressing operations have been completed.

6. A soap press comprising a pair of spaced matrix bars, means for moving each bar from an initial position to a second position, means for pressing the load in each bar when the bar is in its second position, and combination loading and ejecting means disposed between said spaced bars and operative successively to load said bars when they are in their initial positions and to successively eject the loads from said bars when they have returned to their initial positions after the pressing operations have been completed, the cakes being loaded, pressed and ejected from on bar during one cycle of operation of the machine and being loaded, pressed and ejected from the other bar during the succeeding cycle of operation.

7. A soap press comprising a pivoted matrix bar having mold cavities therein, hydraulically actuated means for feeding soap cakes into said bar when the bar is in one position, means for moving the bar to a second position, means for pressing the cakes when the bar is in said second position, means for returning the bar to its initial position, and means for ejecting said cakes from the bar when the bar has returned to its initial position.

8. A soap press comprising a pivoted matrix bar having mold cavities therein, hydraulically actuated means for feeding soap cakes into said bar when the bar is in one position, hydraulically actuated means for moving the bar to a second position, hydraulically actuated means for pressing the cakes when the bar is in said second position, means for returning the bar to its initial position, and means for ejecting said cakes from the bar when the bar has returned to its initial position.

9. A soap press comprising a pair of spaced matrix bars, means for moving each bar from an initial position to a second position, hydraulically actuated combination loading and ejecting means disposed between said spaced bars and operative successively to load said bars when they are in their initial positions and to successively eject the loads from said bars when they have returned to their initial positions and means for pressing the load in each bar when the bar is in its second position, said loads being ejected after the pressing operations have been completed.

10. In combination, a pair of spaced members, each member having a plurality of mold cavities therein, each member being movable from an initial receiving position to a second position, means operative when each member is disposed in its second position to press the material in the mold cavities, means operable to move each member from initial receiving position to its second pressing position and to return each member from its second position to its initial position, and means disposed between said members having oppositely extending pushers adapted to feed articles into the mold cavities and to eject pressed articles from said mold cavities.

11. A soap press comprising a pair of matrix bars, each having mold cavities therein, means for moving said bars from an initial cake receiving position to a second position in which the cakes are pressed and for returning the bars to their initial positions, combination cake feeding and ejecting means operable to feed cakes successively into said matrix bars when said bars are in their initial positions and to eject the pressed cakes from said bars after the cakes have been pressed in the second positions of said bars and the bars have returned to their initial positions, means for pressing the cakes in the bars when the bars are in their second position, and means for operating said feeding and ejecting means in such a manner that when one bar is disposed in its second or cake pressing position the pressed cakes will be ejected from the other bar and unpressed cakes will be fed into the mold cavities therein and vice versa.

JOHN VAN BUREN.